US011579502B2

(12) United States Patent
Lee et al.

(10) Patent No.: US 11,579,502 B2
(45) Date of Patent: Feb. 14, 2023

(54) DISPLAY DEVICE

(71) Applicant: Samsung Display Co., Ltd., Yongin-Si (KR)

(72) Inventors: Se Hyun Lee, Hwaseong-si (KR); Hae Chan Park, Seoul (KR); Min Gyeong Shin, Hwaseong-si (KR); Hye Won Jang, Seoul (KR); Hak Sun Chang, Yongin-si (KR)

(73) Assignee: Samsung Display Co., Ltd.

( * ) Notice: Subject to any disclaimer, the term of this patent is extended or adjusted under 35 U.S.C. 154(b) by 136 days.

(21) Appl. No.: 16/871,182

(22) Filed: May 11, 2020

(65) Prior Publication Data

US 2021/0109413 A1 Apr. 15, 2021

(30) Foreign Application Priority Data

Oct. 14, 2019 (KR) ........................ 10-2019-0126905

(51) Int. Cl.
*G02F 1/1368* (2006.01)
*G02F 1/1362* (2006.01)
(Continued)

(52) U.S. Cl.
CPC ...... *G02F 1/136286* (2013.01); *G02F 1/1368* (2013.01); *G02F 1/134336* (2013.01); (Continued)

(58) Field of Classification Search
CPC ......... G02F 1/136286; G02F 1/134336; G02F 1/1368; G02F 2201/122; G02F 2201/123; (Continued)

(56) References Cited

U.S. PATENT DOCUMENTS

| 2007/0126944 | A1  | 6/2007 | Kim et al. |
| 2010/0188437 | A1  | 7/2010 | Itoh et al. |
| 2012/0008059 | A1* | 1/2012 | Kim ................. G02F 1/134363 349/42 |
| 2012/0194573 | A1* | 8/2012 | Yamashita ........... G09G 3/3614 345/88 |

(Continued)

FOREIGN PATENT DOCUMENTS

| KR | 10-1973584 B1    | 4/2019 |
| KR | 10-2019-0056464 A | 5/2019 |
| KR | 10-1978312 B1    | 5/2019 |

*Primary Examiner* — Temesghen Ghebretinsae
*Assistant Examiner* — Karin Kiyabu
(74) *Attorney, Agent, or Firm* — Innovation Counsel LLP

(57) ABSTRACT

The present disclosure relates to a display device. A display device according to an embodiment of the present inventive concept includes gate lines extending along a first direction, data lines extending along a second direction, pixels including pixel electrodes, each of the pixels including a transistor connected to a gate line and a data line, and a pixel electrode connected to the transistor, the pixels including a first pixel which includes a first pixel electrode connected to a first data line and is disposed in $n^{th}$ pixel row and $m^{th}$ pixel column, and a second pixel which includes a second pixel electrode connected to the first data line or a second data line disposed adjacent to the first data line and is disposed in $(n+1)^{th}$ pixel row and the $m^{th}$ pixel column. The first data line does not overlap the first pixel electrode and overlaps the second pixel electrode.

10 Claims, 12 Drawing Sheets

(51) Int. Cl.
   *G02F 1/1343* (2006.01)
   *G09G 3/36* (2006.01)
(52) U.S. Cl.
   CPC ......... *G09G 3/3688* (2013.01); *G09G 3/3696* (2013.01); *G02F 2201/122* (2013.01); *G02F 2201/123* (2013.01); *G09G 2320/0673* (2013.01)
(58) Field of Classification Search
   CPC ......... G02F 1/134372; G02F 1/134309; G02F 1/1343; G09G 3/3688; G09G 3/3696; G09G 2320/0673; G09G 2300/0447; G09G 2300/0404; G09G 3/3614; G09G 3/3648; G09G 2300/0426; G09G 2320/0276; G09G 2300/0469; G09G 2320/028
   See application file for complete search history.

(56) References Cited

U.S. PATENT DOCUMENTS

| | | | |
|---|---|---|---|
| 2012/0249940 A1* | 10/2012 | Choi | G02F 1/1393 349/123 |
| 2012/0299898 A1* | 11/2012 | Yamashita | G02F 1/1362 345/87 |
| 2013/0070002 A1 | 3/2013 | Hisada et al. | |
| 2013/0321483 A1* | 12/2013 | You | G09G 3/2025 345/690 |
| 2014/0002509 A1 | 1/2014 | Kim et al. | |
| 2016/0055807 A1* | 2/2016 | Lee | G02F 1/13624 345/99 |
| 2019/0296048 A1* | 9/2019 | Lee | G02F 1/134336 |
| 2020/0117062 A1* | 4/2020 | Kim | G02F 1/133707 |
| 2020/0124929 A1* | 4/2020 | Morinaga | G02F 1/136209 |
| 2020/0335057 A1* | 10/2020 | Lee | G09G 3/3688 |

\* cited by examiner

DISPLAY DEVICE

CROSS-REFERENCE TO RELATED APPLICATION

This application claims priority to and the benefit of Korean Patent Application No. 10-2019-0126905 filed in the Korean Intellectual Property Office on Oct. 14, 2019, the entire contents of which are incorporated herein by reference.

BACKGROUND

(a) Technical Field

The present disclosure relates to a display device.

(b) Description of the Related Art

A display device includes a display panel including a plurality of pixels capable of displaying an image. Each pixel includes a pixel electrode receiving a data signal, and the pixel electrode is connected to at least one transistor, thereby receiving the data signal.

Among various display devices, a liquid crystal display includes field generating electrodes including the pixel electrode and a common electrode, and a liquid crystal layer disposed therebetween. The liquid crystal display applies a voltage to the field generating electrode to generate an electric field to the liquid crystal layer, such that a direction of liquid crystal molecules of the liquid crystal layer is determined and a desired image may be displayed by controlling polarization of incident light.

The liquid crystal displays include a pixel which has two or more subpixels to improve side visibility, and two subpixels display images with different luminance.

As a high resolution display device is developed, an aperture ratio of each pixel is lowered. In the case of the display device displaying the image using a pixel which includes two or more subpixels, there is a problem that the aperture ratio of the pixel is further lowered and the transmittance is deteriorated.

The above information disclosed in this Background section is only for enhancement of understanding of the background of the inventive concept and therefore it may contain information that does not form the prior art that is already known in this country to a person of ordinary skill in the art.

SUMMARY

The present disclosure improves lateral visibility while increasing the aperture ratio of the pixel of the display device. In addition, the present disclosure is to reduce a luminance deviation between the pixels of the display device to prevent an occurrence of spots and to improve the transmittance.

A display device according to an embodiment of the present inventive concept includes: a plurality of gate lines extending along a first direction, a plurality of data lines extending along a second direction which intersect the first direction, a plurality of pixels including a plurality of pixel electrodes disposed in a matrix configuration, each of the plurality of pixels including a transistor connected to one of the plurality of gate lines and one of the plurality of data lines, respectively, and a pixel electrode connected to the transistor, the plurality of pixels including a first pixel which includes a first pixel electrode connected to a first data line and is disposed in $n^{th}$ pixel row and $m^{th}$ pixel column, and a second pixel which includes a second pixel electrode connected to the first data line or a second data line disposed adjacent to the first data line and is disposed in $(n+1)^{th}$ pixel row and the $m^{th}$ pixel column, wherein the first data line does not overlap the first pixel electrode and overlaps the second pixel electrode.

A display device according to an embodiment of the present inventive concept includes a plurality of pixels and a plurality of data lines, wherein a plurality of pixels include a plurality of first pixels displaying an image according to a first gamma curve and a plurality of second pixels displaying an image according to a second gamma curve that is different from the first gamma curve, each of a plurality of pixels includes a transistor and a pixel electrode electrically connected to the transistor, and a first data line among a plurality of data lines does not overlap pixel electrodes included in the plurality of first pixels and overlaps pixel electrodes included in the plurality of second pixels.

A display device according to an embodiment of the present inventive concept includes a plurality of pixels and a plurality of data lines, wherein each of a plurality of pixels includes a transistor and a pixel electrode electrically connected to the transistor, the pixel electrode incudes a transverse stem part extending in a first direction, a longitudinal stem part extending in a second direction different from the first direction, and a plurality of branch parts extending in a different direction from the first direction and the second direction, a plurality of pixels include a plurality of first pixels in which the branch part forms a first angle with the first direction and a plurality of second pixels in which the branch part forms a second angle with the first direction, the first angle is smaller than the second angle, and the first data line among a plurality of data lines does not overlap pixel electrodes included in the plurality of first pixels and overlaps pixel electrodes included in the plurality of first pixels.

According to an embodiment of the present inventive concept, the lateral visibility may be improved while increasing the aperture ratio of the pixel of the display device, and the luminance deviation between the pixels may be reduced to prevent the occurrence of spots and to improve the transmittance.

DETAILED DESCRIPTION OF THE EMBODIMENTS

Figure 1:
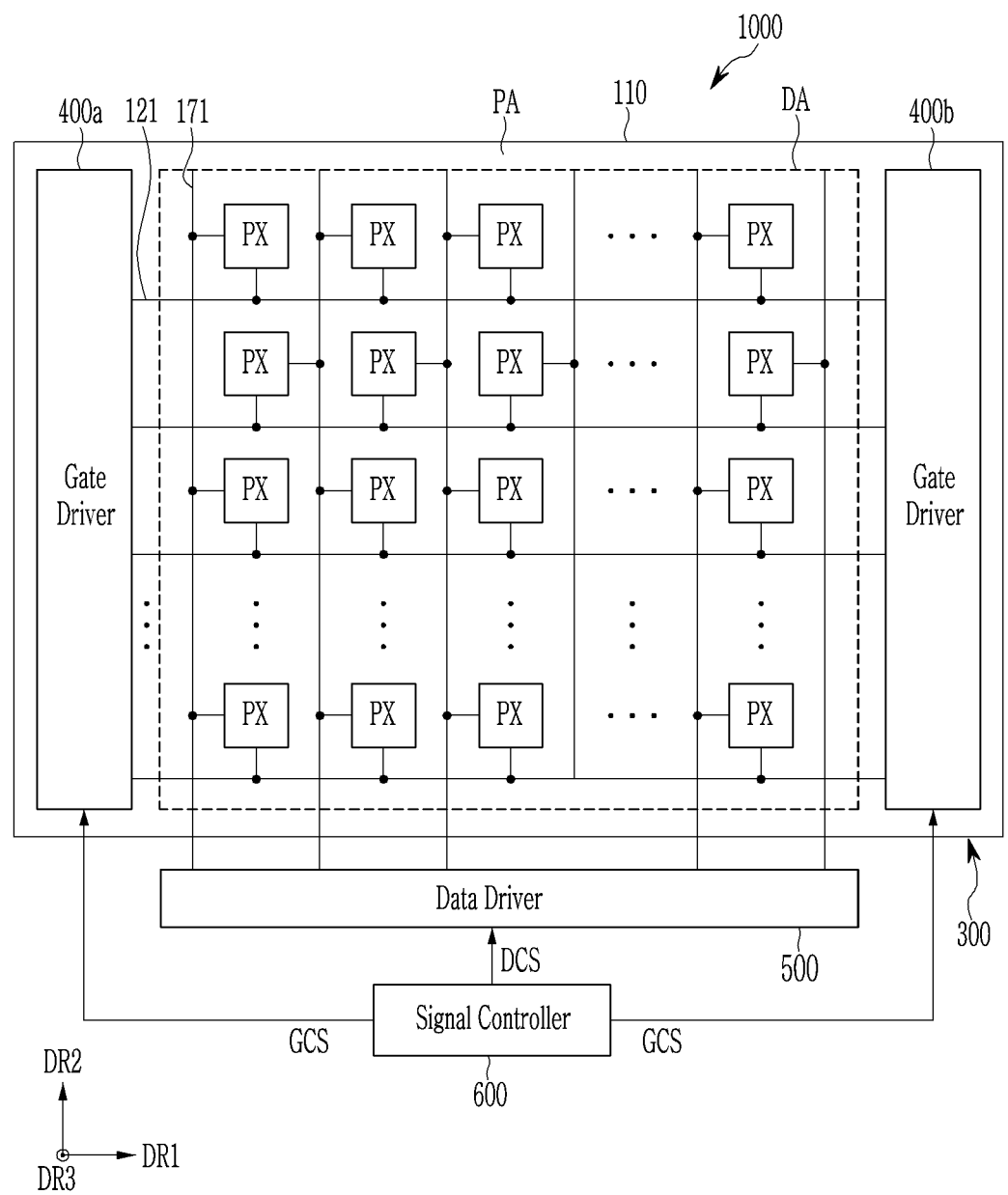
FIG. 1 is a schematic layout view of a display device according to an embodiment of the present inventive concept.

The present inventive concept will be described more fully hereinafter with reference to the accompanying drawings, in which embodiments of the inventive concept are shown. As those skilled in the art would realize, the described embodiments may be modified in various different ways, all without departing from the spirit or scope of the present inventive concept.

In order to clearly explain the present inventive concept, portions that are not directly related to the present inventive concept are omitted, and the same reference numerals are attached to the same or similar constituent elements through the entire specification.

In addition, the size and thickness of each configuration shown in the drawings are arbitrarily shown for better understanding and ease of description, but the present inventive concept is not limited thereto. In the drawings, the thickness of layers, films, panels, regions, etc., are exaggerated for clarity. In the drawings, for better understanding and ease of description, the thicknesses of some layers and areas are exaggerated.

It will be understood that when an element such as a layer, film, region, or substrate is referred to as being "on" another element, it can be directly on the other element or intervening elements may also be present. In contrast, when an element is referred to as being "directly on" another element, there are no intervening elements present. Further, in the specification, the word "on" or "above" means positioned on or below the object portion, and does not necessarily mean positioned on the upper side of the object portion based on a gravitational direction.

In addition, unless explicitly described to the contrary, the word "comprise" and variations such as "comprises" or "comprising" will be understood to imply the inclusion of stated elements but not the exclusion of any other elements.

Throughout this specification, a plan view means a view when observing a surface parallel to two directions (e.g., a first direction DR1 and a second direction DR2) crossing each other, and a cross-sectional view means a view when observing a surface cut in a direction (e.g., a third direction) perpendicular to the surface parallel to the first direction DR1 and the second direction DR2. Also, to overlap two constituent elements means that two constituent elements are overlapped in the third direction (e.g., a direction perpendicular to an upper surface of the substrate) unless stated otherwise.

First, a display device according to an embodiment of present inventive concept is described with reference to FIG. 1 to FIG. 5.

Figure 2:
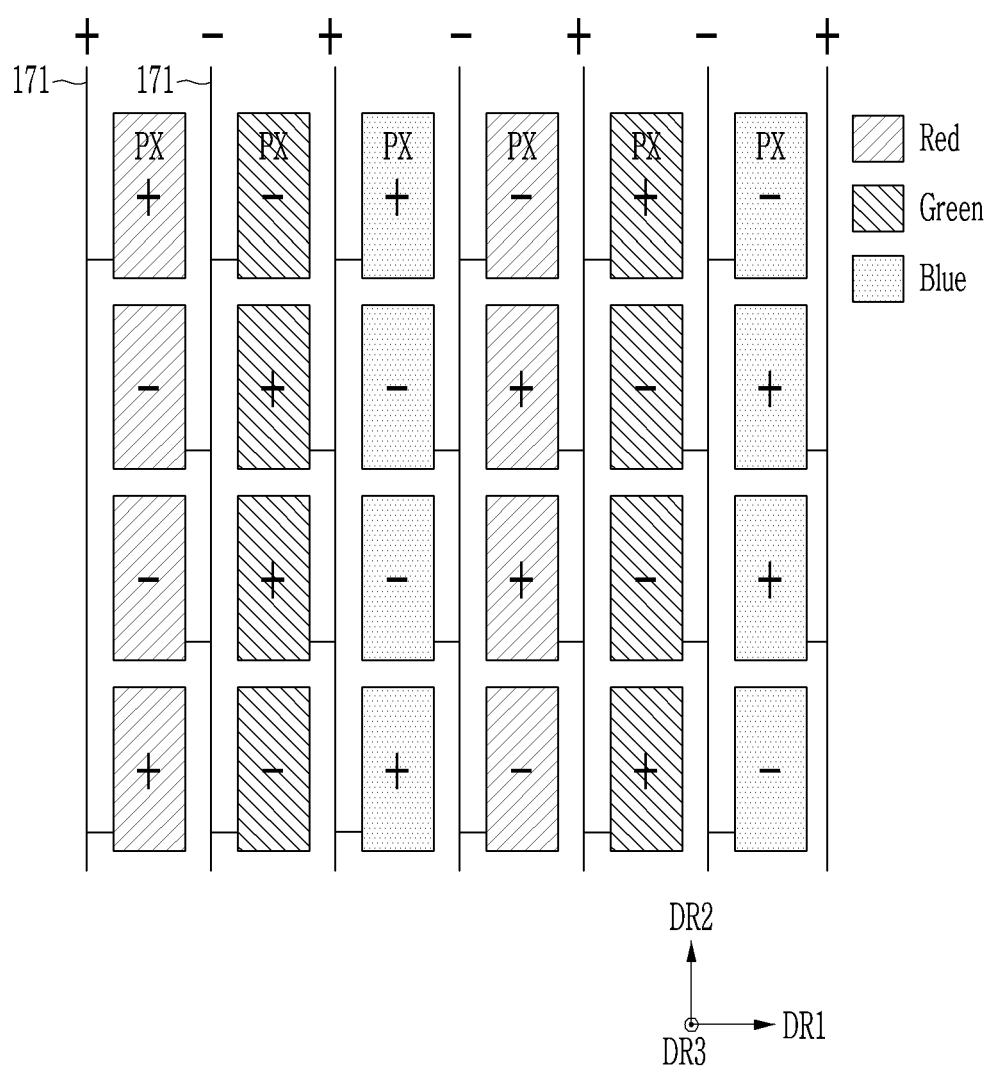
FIG. 2 is a schematic layout view showing a connection relationship between a plurality of data lines and a plurality of pixels of display device according to an embodiment of the present inventive concept.

FIG. 1 is a schematic layout view of a display device according to an embodiment of the present inventive concept, and FIG. 2 is a schematic layout view showing a connection relationship between a plurality of data lines and a plurality of pixels of display device according to an embodiment of the present inventive concept.

Referring to FIG. 1, a display device 1000 according to an embodiment of the present inventive concept includes a display panel 300 including a display area DA and a peripheral area PA disposed outside the display area DA to surround the display area DA. The display panel 300 includes a first substrate 110.

The display area DA which is capable of displaying an image according to an input image signal includes a plurality of pixels PX, a plurality of gate lines 121 and a plurality of data lines 171.

The pixel PX is a basic unit for displaying the image, and each pixel PX may include at least one transistor and at least one pixel electrode electrically connected to the transistor.

A plurality of pixels PX may be arranged regularly, for example in a matrix form.

For displaying various colors, each pixel PX may display one among primary colors, and the image of a desired color may be recognized by a spatial and temporal combination of the primary colors. For example, the primary colors may be three primary colors such as red, green, and blue, and white may be further included.

In FIG. 1 and FIG. 2, when the first direction DR1 is referred to as a row direction and the second direction DR2 is referred to as a column direction, as shown in FIG. 2, the pixels PX in each pixel column may represent the same primary color as each other, and the pixels PX in adjacent pixel columns may represent different primary colors from each other. FIG. 2 shows an example of the primary colors of red, green, and blue.

Alternatively, the pixels PX in each pixel row may represent the same primary color as each other, and the pixels PX in the neighboring pixel rows may represent different primary colors from each other. As another example, four neighboring pixels PX in a square shape may represent two or more different primary colors. For example, four adjacent pixels PX in a square shape may represent red, green, blue, and white, respectively.

The gate line 121 may transmit a gate signal that includes a gate-on voltage and a gate-off voltage. A plurality of gate lines 121 may be generally arranged side by side in the second direction DR2, and each gate line 121 may extend substantially in the first direction DR1.

The data line 171 may transmit a data voltage corresponding to the input image signal. A plurality of data lines 171 may be generally arranged in a direction parallel to the first direction DR1, and each data line 171 may generally extend in a second direction DR2.

A gate terminal of the transistor included in each pixel PX may be electrically connected to a corresponding gate line 121 to receive a gate signal, and a source terminal of the transistor may be electrically connected to a corresponding data line 171 to receive a data voltage. The transistor of the pixel PX is turned on or off according to the gate signal of the gate line 121 to selectively transmit the data voltage from the data line 171 to the pixel electrode. Each pixel PX may display the image according to the data voltage applied to the pixel electrode.

According to an embodiment of the present inventive concept, the transistor of each pixel PX may be electrically connected to one data line 171 and one gate line 121 to receive the data voltage and the gate signal.

Referring to FIG. 1, the transistors of a plurality of pixels PX disposed in one pixel column may be alternately connected to two adjacent data lines 171. For example, as shown in FIG. 1, a plurality of pixels PX of each pixel column may be alternately connected to two adjacent data lines 171 on a basis of one pixel row. This is referred to as a one-pixel stagger structure.

According to another embodiment, as shown in FIG. 2, the transistors of a plurality of pixels PX of each pixel column may be alternately connected to two adjacent data lines 171 on a basis of two or more pixel rows. For example, the pixels PX of two adjacent pixel rows may be connected to the data line 171 on the left side, and the pixels PX of next two adjacent pixel rows may be connected to the data line 171 on the right side. This is referred to as a two-pixel stagger structure.

The transistors of a plurality of pixels PX of each pixel row may be connected to the data line 171 of the same side with respect to the plurality of pixels PX. For example, as shown in FIG. 1 and FIG. 2, the pixels PX of the first pixel row may be connected to the data line 171 disposed on the left side, and the pixels PX of the second pixel row may be connected to the data line 171 disposed on the right side. However, an embodiment of the present inventive concept is not limited thereto.

Referring to FIG. 2, when the input image signal of one frame for all pixels PX is input, the data voltages applied to two neighboring data lines 171 may have opposite polarities (+, −) with respect to a common voltage. Thus, as shown in FIG. 2, inversion driving (column inversion driving) is possible in the row direction (or the first direction DR1) for each pixel row.

If a plurality of pixels PX in each pixel column are connected alternately to two neighboring data lines 171 on a basis of two pixel rows, as shown in FIG. 2, inversion driving (two rows inversion driving) is possible on a basis of two pixel rows in the column direction (or the second direction DR2) for each pixel column.

In contrast, as shown in FIG. 1, a plurality of pixels PX of each pixel column may be connected alternately to two data lines 171 adjacent to each other on a basis of one pixel row. In this case, inversion driving (row inversion driving) may be possible in a column direction (or the second direction DR2) on a basis of one pixel row for each pixel column.

If the input image signal of the next frame is input, the data voltage of the opposite polarity to the previous frame may be applied to each data line 171 (frame inversion).

As above-described, the neighboring data lines 171 receives the data voltages of the opposite polarity from each other during one frame and each pixel PX receives the data voltages of the opposite polarities in the different frames to display the image, thereby preventing occurrence of degradation of a display characteristic.

The peripheral area PA may mostly be a region that does not display the image, and is a region adjacent to the display area DA. For example, the peripheral area PA may surround the display area DA. However, if necessary, at least part of the peripheral area PA may display the image.

The peripheral area PA may include gate drivers 400a and 400b.

The gate drivers 400a and 400b may be electrically connected to a plurality of gate lines 121 to apply a gate signal. FIG. 1 shows an example in which the first gate driver 400a is disposed in the peripheral area PA disposed on the left side of the display area DA and the second gate driver 400a is disposed in the peripheral area PA disposed on the right side. The gate drivers 400a and 400b may generate the gate signal including the gate-on voltage and the gate-off voltage, and may sequentially apply the gate signals to a plurality of gate lines 121 in a direction parallel to the second direction DR2.

The gate drivers 400a and 400b may be formed directly on the peripheral area PA in the same process together with electrical elements such as the transistors in the display area DA.

One of the first and second gate drivers 400a and 400b may be omitted.

The display device 1000 according to an embodiment of the present inventive concept may further include a data driver 500 and a signal controller 600.

The data driver 500 is electrically connected to a plurality of data lines 171. The data driver 500 may selectively apply a data voltage, which is a gray voltage that corresponds to the input image signal, to the corresponding data line 171 under the control of the signal controller 600.

The signal controller 600 outputs control signals GCS to the gate drivers 400a and 400b and DCS to the data driver 500 to control the gate drivers 400a and 400b and the data driver 500.

The data driver 500 and/or the signal controller 600 may be mounted in the peripheral area PA of the display panel 300 in a form of a plurality of driving chips, or may be mounted on a flexible printed circuit film or a printed circuit board (PCB) which is electrically connected to the display panel 300.

Figure 3:
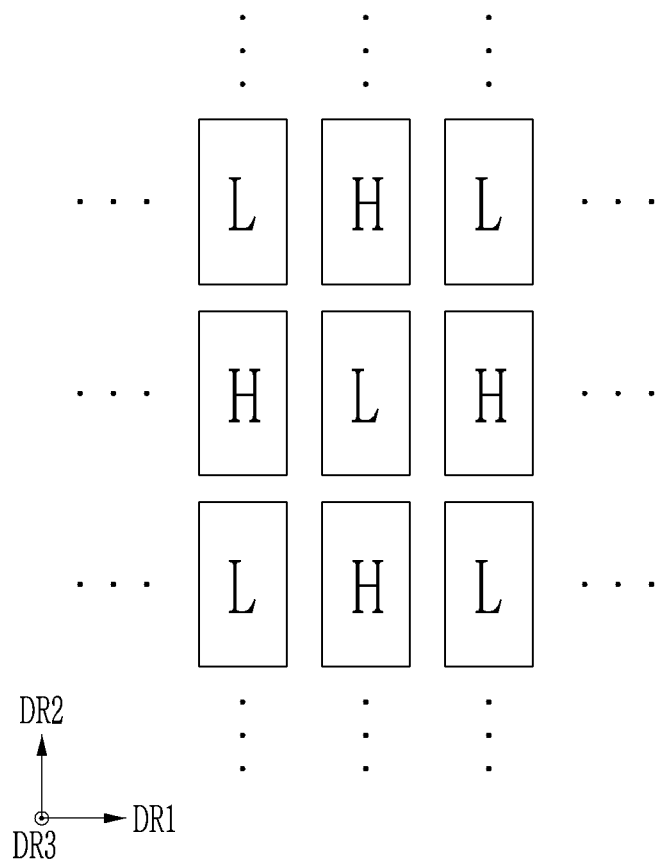
FIG. 3 is a view showing luminance for an image displayed by a plurality of pixels of a display device according to an embodiment of the present inventive concept.
Figure 4:
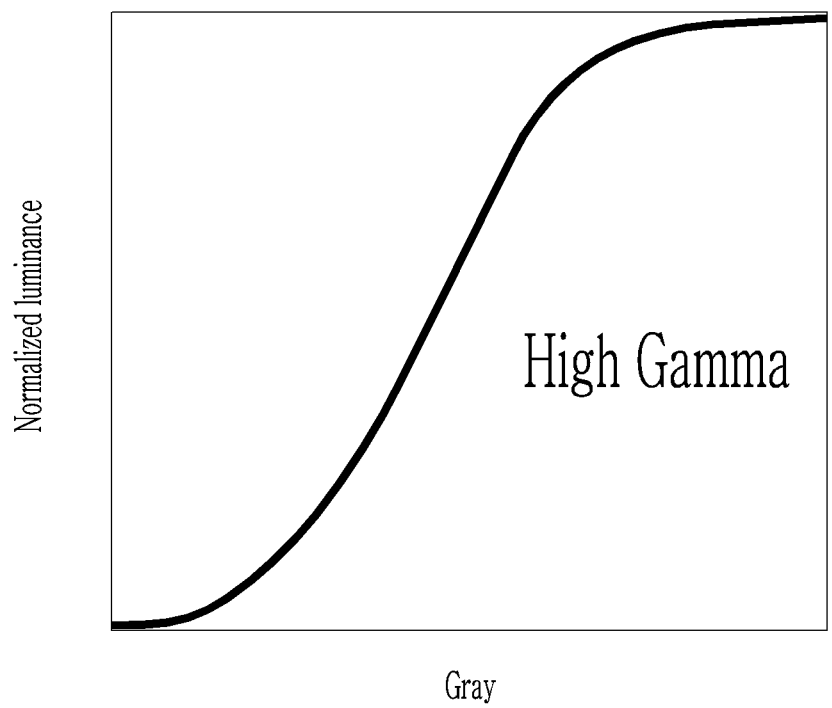
FIG. 4 is a graph of a gamma curve for an image displayed by one pixel of a display device according to an embodiment of the present inventive concept.
Figure 5:
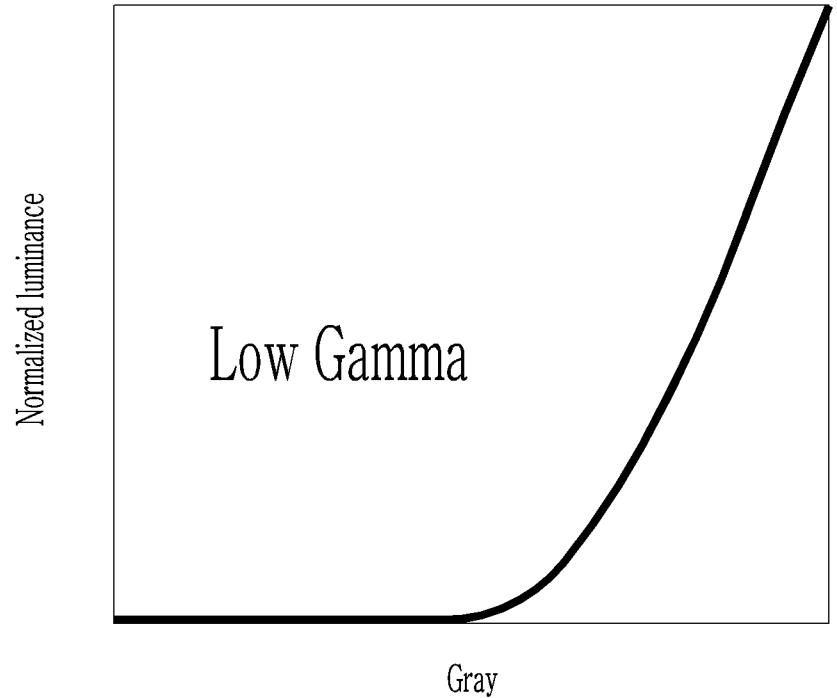
FIG. 5 is a graph of a gamma curve for an image displayed by one pixel of a display device according to an embodiment of the present inventive concept.

FIG. 3 is a view showing luminance for an image displayed by a plurality of pixels of a display device according to an embodiment of the present inventive concept, FIG. 4 is a graph of a gamma curve for an image displayed by one pixel of a display device according to an embodiment of the present inventive concept, and FIG. 5 is a graph of a gamma curve for an image displayed by one pixel of a display device according to an embodiment of the present inventive concept.

Referring to FIG. 3 to FIG. 5, a plurality of pixels PX of the display device according to an embodiment of the present inventive concept may include a high gray pixel H and a low gray pixel L displaying the image according to each input image signal depending on the different gamma curves during each frame. The high gray pixel is also referred to as a high gamma pixel, and the low gray pixel is also referred to as a low gamma pixel.

A gamma curve is a curved line that shows a normalized luminance or transmittance in accordance with a gray of the input image signal, and a gray voltage may be determined in the data driver 500 based on the gamma curve. That is, the data driver 500 may generate a gray voltage according to a gamma curve corresponding to each pixel PX, and select a data voltage corresponding to the input image signal for each pixel PX in accordance with the gray voltage to be applied to the data line 171 connected with the corresponding pixel PX.

Information about the gamma curve may be stored in a separate memory connected with the signal controller 600 or in the signal controller 600.

FIG. 4 and FIG. 5 are graphs of two different gamma curves stored in a display device according to an embodiment of the present inventive concept. FIG. 4 is the gamma curve for a high gray pixel H, and FIG. 5 is the gamma curve for a low gray pixel L. The luminance of the image according to the gamma curve of the high gray pixel H may be higher than or equal to the luminance of the image according to the gamma curve of the low gray pixel L.

To improve the side visibility of the display device, a synthetic gamma curve at the front of the gamma curve of the high gray pixel H and the gamma curve of the low gray pixel L should be the same as the front gamma curve which is optimized for the display device, and the synthetic gamma curve of the side can be adjusted and stored to be as close as possible to the front gamma curve.

Again, referring to FIG. 3, the high gray pixel H and the low gray pixel L may be alternately arranged in the first direction DR1 and the second direction DR2. Differently from FIG. 3, for each pixel row or each pixel column, the high gray pixel H and the low gray pixel L may be alternately disposed on the basis of two or more pixels PX. Hereinafter, the high gray pixel H and the low gray pixel L are described based on a structure in which the high gray pixel H and the low gray pixel L are alternately disposed along the first direction DR1 and the second direction DR2.

According to an embodiment of the present inventive concept, the plurality of spatially distributed pixels PX display the image of the luminance according to the different gamma curves, thereby displaying the image having improved side visibility throughout the display area DA. In the present embodiment, the different pixel PXs may display the images according to the different input image signals.

When comparing with a case that each pixel PX includes a plurality of subpixels displaying the images according to the different gamma curves and includes a plurality of transistors, each pixel PX according to an embodiment of the present inventive concept displays the image of the luminance depending on one gamma curve, so it does not need to include a plurality of subpixels. Therefore, the aperture ratio of each pixel PX is relatively high, thereby increasing transmittance. As the resolution of the display device 1000 becomes higher, the size of the pixel PX becomes smaller. As a result, according to a conventional pixel PX which includes a plurality of subpixels, the aperture ratio of the pixel PX decrease. However, according to an embodiment of the present inventive concept, because the pixel does not include a plurality of subpixels which has different luminance, the aperture ratio of the pixel PX may increase as compared to the conventional pixel PX. The high resolution display device may also maintain the high transmittance.

Next, the detailed structure of the display device according to an embodiment of the present inventive concept is described with reference to FIG. 6 to FIG. 10 along with the above-described drawings.

Figure 6:
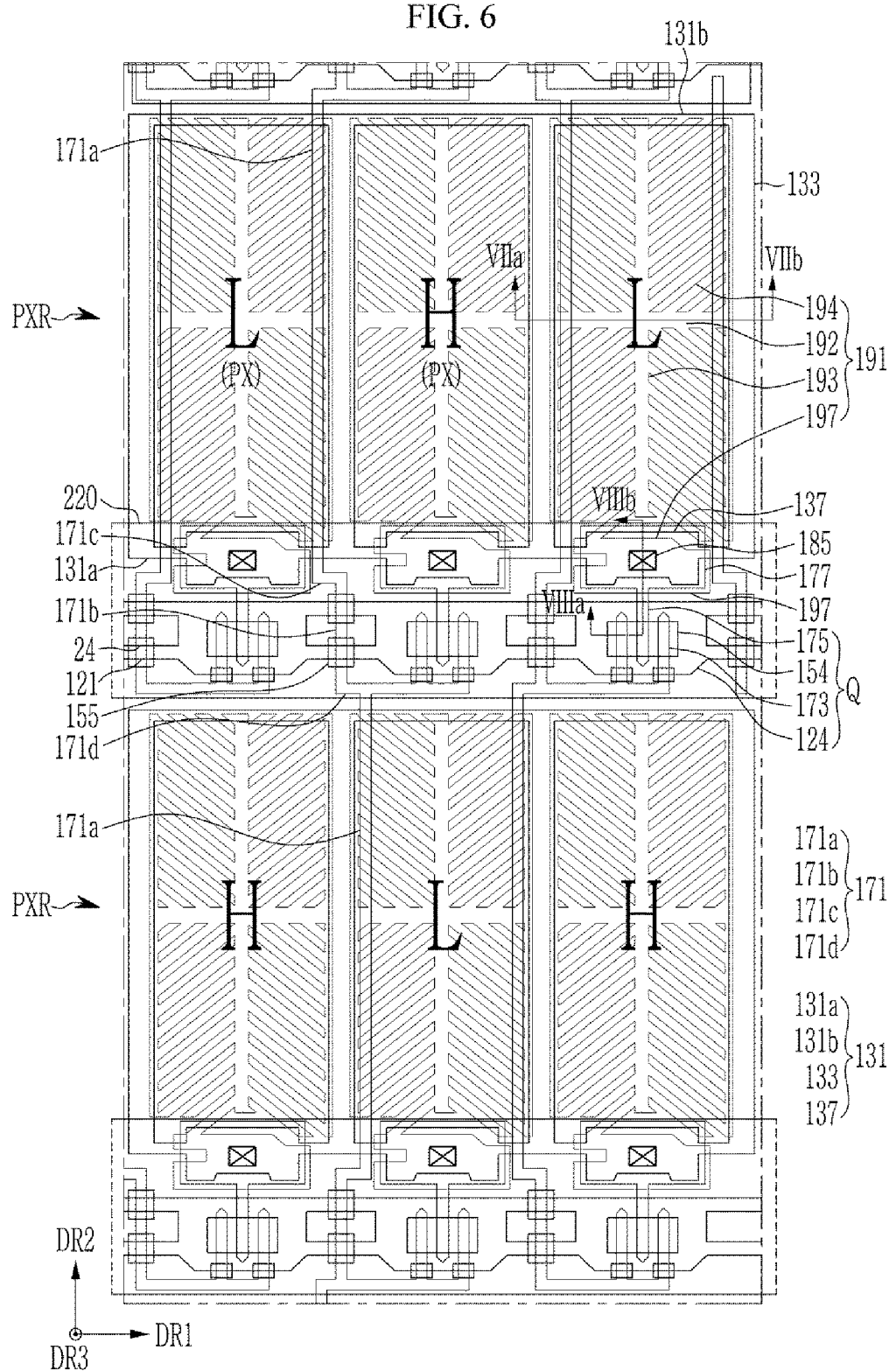
FIG. 6 is a layout view for a plurality of pixels of a display device according to an embodiment of the present inventive concept.
Figure 7:
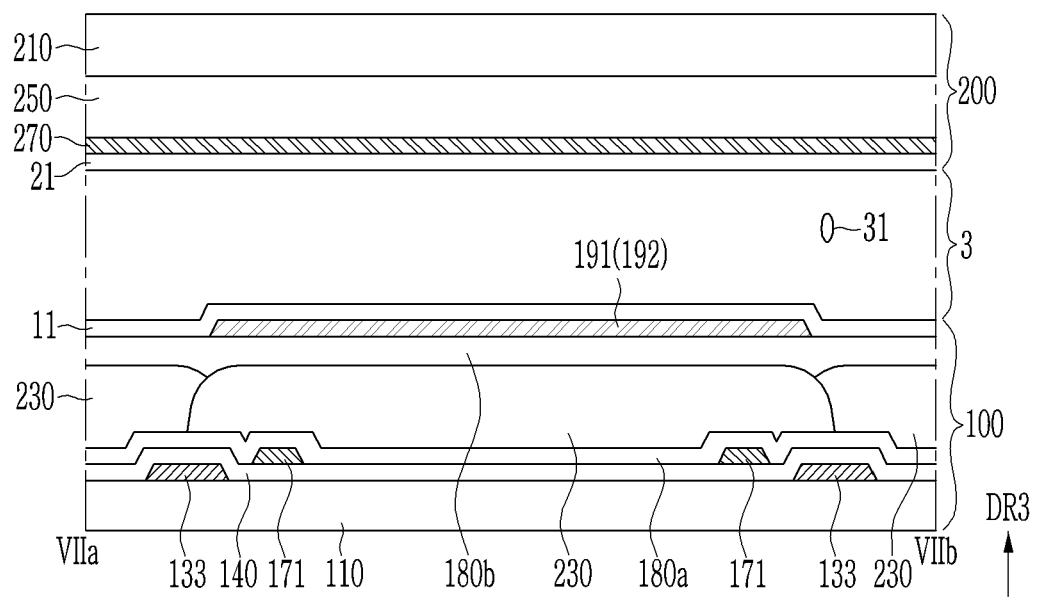
FIG. 7 is a cross-sectional view of the display device shown in FIG. 6 taken along a line VIIa-VIIb.
Figure 8:
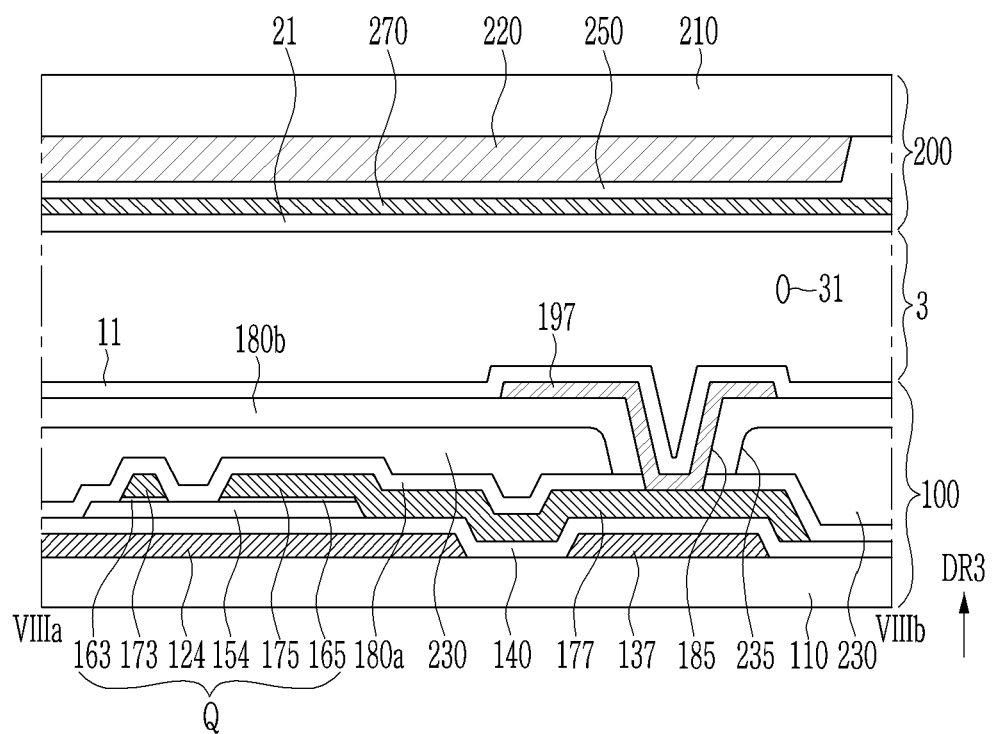
FIG. 8 is a cross-sectional view of the display device shown in FIG. 6 taken along a line VIIIa-VIIIb.
Figure 9:
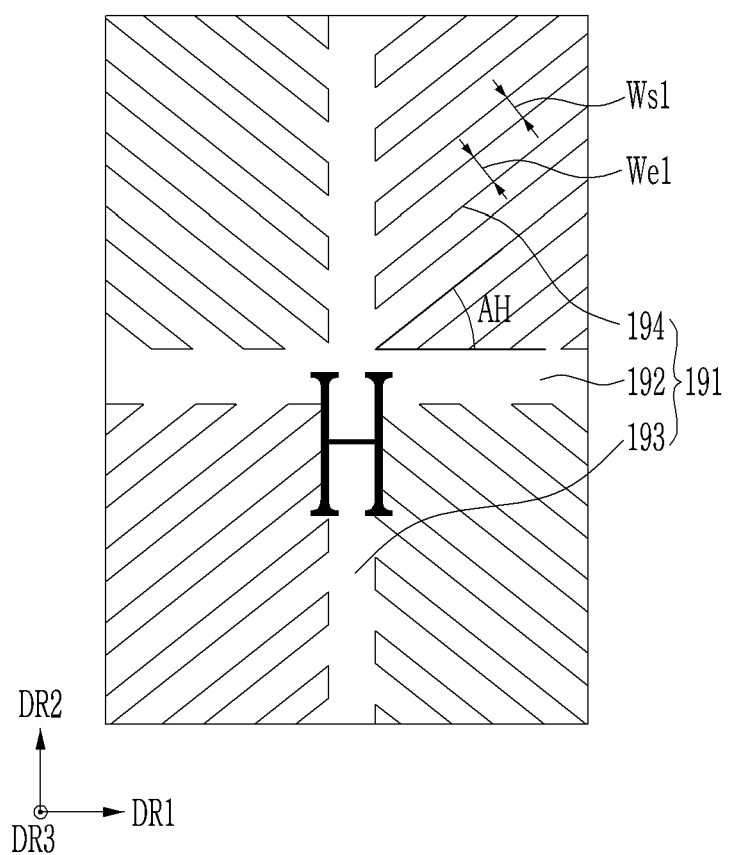
FIG. 9 is a top plan view of a part of a pixel electrode of a display device according to an embodiment of the present inventive concept.
Figure 10:
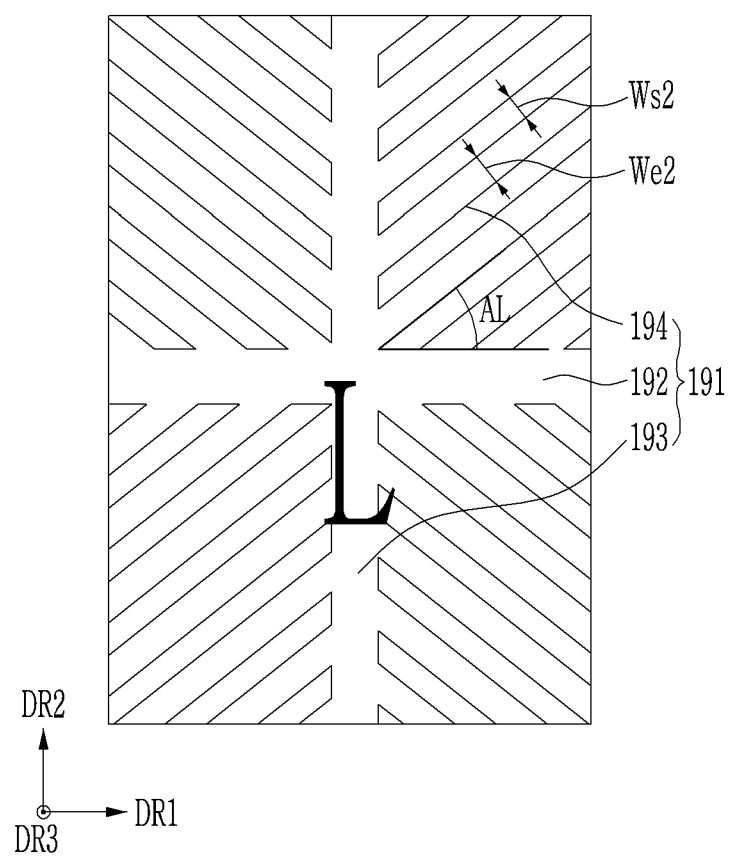
FIG. 10 is a top plan view of a part of a pixel electrode of a display device according to an embodiment of the present inventive concept.

FIG. 6 is a layout view for a plurality of pixels of a display device according to an embodiment of the present inventive concept, FIG. 7 is a cross-sectional view of the display device shown in FIG. 6 taken along a line VIIa-VIIb, FIG. 8 is a cross-sectional view of the display device shown in FIG. 6 taken along a line VIIIa-VIIIb, FIG. 9 is a top plan view of a part of a pixel electrode of a display device according to an embodiment of the present inventive concept, and FIG. 10 is a top plan view of a part of a pixel electrode of a display device according to an embodiment of the present inventive concept.

The display device according to an embodiment of the present inventive concept includes a first display panel 100 and a second display panel 200 facing each other, and a liquid crystal layer 3 interposed between the two display panels 100 and 200. The first display panel 100 includes a first substrate 110 and the second display panel 200 includes a second substrate 210. Hereinafter, 'on' represents an upper side of the first substrate 110 and the second substrate 210, and 'under' represent a lower side of the first substrate and the second substrate 210.

First, if the first display panel 100 is described, a plurality of gate lines 121 and a plurality of storage electrode lines 131 may be disposed on the first substrate 110. The gate lines 121 and the storage electrode lines 131 may be formed of the same gate conductive layer.

Each gate line 121 may transmit a gate signal and may extend along a direction approximately parallel to the first direction DR1. Each gate line 121 may include a plurality of gate electrodes 124. The gate electrode 124 may include a portion protruded from the gate line 121. The gate line 121 may have an opening 24 disposed between two gate electrodes 124 neighboring in the first direction DR1 and disposed in regions in which the plurality of gate lines 121 and the plurality of data lines 171 crossing each other.

The storage electrode line 131 is spaced apart from gate line 121 and may transmit a predetermined voltage. Each storage electrode line 131 may include a transverse part 131a, an expansion part 137, and a longitudinal part 133.

The transverse part 131a may extend along a direction approximately parallel to the first direction DR1.

The transverse part 131a may include an expansion part 137 disposed at each pixel PX H and L.

The longitudinal part 133 may be protruded and extended from the transverse part 131a in approximately the second direction DR2. The longitudinal part 133 may be disposed between two pixels PX H and L neighboring in the first direction DR1.

The storage electrode line 131 may further include a transverse part 131b which is spaced apart from the transverse part 131a and elongates approximately in the first direction DR1. The longitudinal part 133 is disposed between two transverse parts 131a and 131b, and may be connected to ends of the two transverse parts 131a and 131b.

A gate insulating layer 140 may be disposed on the gate conductive layer. The gate insulating layer 140 may include an insulating material such as a silicon nitride (SiNx), a silicon oxide (SiOx), a silicon oxynitride, etc.

A semiconductor layer including a plurality of semiconductors 154 may be disposed on the gate insulating layer 140. The semiconductor layer may include a semiconductor material such as amorphous silicon, polycrystalline silicon, a metal oxide, etc.

Each semiconductor 154 may be disposed on each gate electrode 124, and may overlap with the gate electrode 124 in a plan view (or in a direction perpendicular to the upper surface of the first substrate 110).

Ohmic contact layers 163 and 165 may be disposed on the semiconductor layer. The ohmic contact layers 163 and 165 may include n+ hydrogenated amorphous silicon in which an n-type impurity such as phosphorus is doped with a high concentration or silicide.

A data conductive layer including a plurality of data lines 171, a plurality of source electrodes 173, and a plurality of drain electrodes 175 may be disposed on the ohmic contact layers 163 and 165 and the gate insulating layer 140.

Each data line 171 may transmit a data voltage, and may generally extend in a direction parallel to the second direction DR2 to intersect the gate line 121.

The source electrode 173 disposed at each pixel PX H and L may be electrically connected to each corresponding data line 171 to receive the data voltage. Each source electrode 173 may include a portion overlapping with the gate electrode 124 and curved in an approximately U letter shape. However, the shape of the source electrode 173 is not limited to the configuration shown in FIGS. 6 and 11 in this specification.

The drain electrode 175 is spaced apart from the data line 171 and the source electrode 173.

Each drain electrode 175 may include one end portion facing the source electrode 173 in a region overlapping the gate electrode 124 and the semiconductor 154 and surrounded by the curved portion of the source electrode 173. The drain electrode 175 may include an expansion part 177 disposed at the other end. The expansion part 177 may be disposed above the gate line 121 in a plan view.

In a plan view, the expansion part 177 may overlap the expansion part 137 of the storage electrode line 131. The expansion part 177 of the drain electrode 175 and the expansion part 137 of the storage electrode line 131 that overlap each other via the gate insulating layer 140 interposed therebetween may form a storage capacitor capable of maintaining the charge voltage of the pixel PX.

The opening 24 in the gate line 121 is disposed in a region in which the data line 171 crosses the gate line 121 to reduce the signal delay due to a parasitic capacitor formed between the gate line 121 and the data line 171.

The ohmic contact layers 163 and 165 exist only between the underlying semiconductor 154 and the overlying data conductive layer and may lower the contact resistance therebetween.

At least one of the gate conductive layer and the data conductive layer may include at least one among metals such as copper (Cu), aluminum (Al), magnesium (Mg), silver (Ag), gold (Au), platinum (Pt), palladium (Pd), nickel (Ni), neodymium (Nd), iridium (Jr), molybdenum (Mo), tungsten (W), titanium (Ti), chromium (Cr), tantalum (Ta), and alloys thereof.

In addition, other specific structures of the data line 171 are described later.

The gate electrode 124, the source electrode 173, and the drain electrode 175 form a thin film transistor Q of a switching element along with the overlapped semiconductor 154. The channel of the thin film transistor Q is formed in the semiconductor 154 disposed between the source electrode 173 and the drain electrode 175.

A first insulating layer 180a may be disposed on the data conductive layer, and a plurality of color filters 230 may be disposed on the first insulating layer 180a. The color filter 230 may pass one of primary colors such as three primary colors of red, green, and blue, or four primary colors. A plurality of color filters representing the different primary colors in a plan view may be alternately disposed in the first direction DR1.

The color filter 230 may have an opening 235 formed on the expansion part 177 of the drain electrode 175.

Two adjacent color filters 230 may overlap each other at a boundary between two pixels PX H and L neighboring in the first direction DR1.

A second insulating layer 180b may be disposed on the color filter 230.

The first insulating layer 180a and the second insulating layer 180b may include an inorganic insulating material such as a silicon nitride, a silicon oxide, a silicon oxynitride, and/or an organic insulating material. For example, the first insulating layer 180a may include the inorganic insulating material, and the second insulating layer 180b may include the organic insulating material. In this case, the upper surface of the second insulating layer 180b may be substantially flat. The second insulating layer 180b serves as an overcoat for the color filter 230 to prevent the color filter 230 from being exposed and to prevent an impurity such as a pigment, which the color filter 230 includes, from flowing into the liquid crystal layer 3.

The first insulating layer 180a and the second insulating layer 180b may have an opening 185 formed on the expansion part 177 of the drain electrode 175 and overlapping the expansion part 177. In a plan view, the opening 185 may be formed in the opening 235 of the color filter 230.

A plurality of pixel electrodes 191 may be disposed on the second insulating layer 180b. The pixel electrode 191 may include a transparent conductive material such as an indium-tin oxide (ITO), an indium-zinc oxide (IZO), a metal thin film, etc.

Referring to FIG. 6, one pixel electrode 191 may be disposed in each pixel PX H and L.

The overall shape of each pixel electrode 191 may be approximately quadrangular, and portions of the pixel electrode 191 may be removed to enhance a movement of the liquid crystal layer 3.

In detail, each pixel electrode 191 may include a transverse stem part 192, a longitudinal stem part 193, a plurality of branch parts 194, and an expansion part 197.

The transverse stem part 192 may extend substantially parallel to the first direction DR1, and the longitudinal stem part 193 may extend substantially parallel to the second direction DR2, thereby intersecting the transverse stem part 192. The transverse stem part 192 and the longitudinal stem part 193 intersecting and connected to each other may form a cross shape together.

A plurality of branch parts 194 are connected to the transverse stem part 192 or the longitudinal stem part 193, and extend in an oblique direction in the first direction DR1 and the second direction DR2. The pixel electrode 191 disposed between neighboring branch parts 194 is removed to form a slit.

The expansion part 197 may overlap the expansion part 177 of the drain electrode 175 in a plan view. The expansion part 197 is electrically connected to the expansion part 177 of the drain electrode 175 through the opening 185 of the first and second insulating layers 180a and 180b, thereby the pixel electrode 191 may receive the data voltage from the drain electrode 175.

The left and right edge portions of the pixel electrode 191 may or may not overlap the longitudinal part 133 of the storage electrode line 131.

Next, the second display panel 200 is described. As shown in FIG. 7 and FIG. 8, a light blocking member 220 may be disposed under the second substrate 210.

Referring to FIG. 6, the light blocking member 220 is mainly disposed between the pixel electrodes 191 adjacent in the second direction DR2 to prevent light leakage between the neighboring pixel electrodes 191. The light blocking member 220 may be extended in a direction mainly parallel to the first direction DR1. In a plan view, the light blocking member 220 overlaps most of the region where thin film transistor Q, the gate line 121, and the drain electrode 175 are disposed to prevent light leakage.

On the other hand, the longitudinal part 133 of the storage electrode line 131 described above overlaps most of the space between two pixel electrodes 191 neighboring in the first direction DR1 to prevent light leakage between the pixel electrodes 191 neighboring in the first direction DR1.

As such, a lattice-shaped light blocking portion may be formed by the light blocking member 220 and the longitudinal part 133 of the storage electrode line 131. The light blocking portion may cover the part between two pixel rows PXR neighboring in the second direction DR2 to prevent light leakage between pixels PX neighboring in the second direction DR2. The thin film transistor Q may be disposed in the light blocking portion where the light blocking member 220 is disposed.

Again, referring to FIG. 7 and FIG. 8, an insulating layer 250 may be disposed under the light blocking member 220, and a common electrode 270 may be disposed thereunder.

The insulating layer 250 may include an inorganic insulating material and/or an organic insulating material. The insulating layer 250 may prevent the light blocking member 220 from being exposed, and may prevent a material such as black carbon included in the light blocking member 220 from permeating into the liquid crystal layer 3.

The common electrode 270 may be formed continuously in most of the regions corresponding to the display area DA. The common electrode 270 may include a transparent conductive material such as ITO or IZO, or a metal such as aluminum, silver, chromium, or an alloy thereof.

Unlike the description above, the color filter 230 may be disposed between the second substrate 210 and the common electrode 270.

The liquid crystal layer 3 may include liquid crystal molecules 31 having dielectric anisotropy. The liquid crystal molecule 31 may be oriented such that its major axis is perpendicular or parallel to the planes of substrates 110 and 210 in the absence of an electric field in the liquid crystal layer 3.

An alignment layer 11 may be disposed on the pixel electrode 191 and the second insulating layer 180$b$, and an alignment layer 21 may be disposed below the common electrode 270. The two alignment layers 11 and 21 may be vertical alignment layers.

In such a display device, when a data voltage is applied to the pixel electrode 191 and a common voltage is applied to the common electrode 270, an electric field is generated on the liquid crystal layer 3. The electric field includes a vertical component in a direction approximately perpendicular to the planes of two substrates 110 and 210, and may have a fringe field component by the edges of the patterns such as the transverse stem part 192, the longitudinal stem part 193, and the plurality of branch parts 194 of the pixel electrode 191. In response to this electric field, the liquid crystal molecules 31 may be tilted in the direction approximately parallel to the planes of the substrates 110 and 210 and in the direction approximately parallel to the direction in which the branch part 194 extends. Since the pixel electrode 191 of one pixel PX includes a plurality of branch parts 194 extending in four different directions, the liquid crystal layer 3 corresponding to each pixel electrode 191 may include four regions in which the liquid crystal molecules 31 are inclined in different directions.

Next, the detailed structure of the data line 171 is described with reference to FIG. 6.

Each data line 171 extends substantially in the second direction DR2 but may include a bent portion. In detail, each data line 171 may include a first longitudinal part 171$a$, a second longitudinal part 171$b$, a first transverse part 171$c$ and a second transverse part 171$d$.

The first longitudinal part 171$a$ extends generally in the second direction DR2 and overlaps the pixel electrode 191. The first longitudinal part 171$a$ may overlap the left or right edge portions of the pixel electrode 191.

Two first longitudinal parts 171$a$ respectively disposed in two pixel rows PXR may be disposed to be offset from each other in the first direction DR1. That is, each extending line of two first longitudinal parts 171$a$ respectively disposed in two pixel rows PXR may extend parallel to each other without coinciding with each other, for example, extending lines of the two first longitudinal parts 171$a$ do not disposed on a single line. Two pixel rows PXR in which these two first longitudinal parts 171$a$ are disposed may be adjacent in the second direction DR2 as shown in FIG. 6.

The second longitudinal part 171$b$ may be disposed between two first longitudinal parts 171$a$ respectively disposed in two adjacent pixel rows PXR, and may generally extend parallel to the first longitudinal part 171$a$ along the second direction DR2. The second longitudinal part 171$b$ may overlap the light blocking member 220 in a plan view and intersect and overlap the gate line 121. Particularly, the second longitudinal part 171$b$ may intersect and overlap the opening 24 in the gate line 121.

In portions where the second longitudinal part 171$b$ and the gate line 121 overlap, a semiconductor pattern 155 is disposed between the gate line 121 and the second longitudinal part 171$b$.

The second longitudinal part 171$b$ may extend between the first longitudinal part 171$a$ disposed in the pixel row PXR disposed above and the first longitudinal part 171$a$ disposed in the pixel row PXR disposed below in a plane view. That is, the extending lines of the second longitudinal part 171$b$ may be parallel to each other without being coincident with the extending lines of the first longitudinal part 171$a$ neighboring in the second direction DR2.

The length of the first longitudinal part 171$a$ extending along the second direction DR2 may be longer than the length of the second longitudinal part 171$b$ extending along the second direction DR2.

Each of the first transverse part 171$c$ and the second transverse part 171$d$ may extend in a direction different from the first longitudinal part 171$a$ and the second longitudinal part 171$b$ extend. For example, each of the first transverse part 171$c$ and the second transverse part 171$d$ may extend substantially perpendicular to the direction to which the first longitudinal part 171$a$ and the second longitudinal part 171$b$ extend, that is, in the second direction DR2.

The first transverse part 171$c$ and the second transverse part 171$d$ may be connected with an upper end and a lower end of the second longitudinal part 171$b$, respectively. The first transverse part 171$c$ may connect the upper end of the second longitudinal part 171$b$ to a lower end of its neighboring first longitudinal part 171$a$, and the second transverse part 171$d$ may connect the lower end of the second longitudinal part 171$b$ to an upper end of its neighboring first longitudinal part 171$a$.

The source electrode 173 of the thin film transistor Q may be connected to the second transverse part 171$d$, and may include a part extending from the second transverse part 171$d$ in the second direction DR2 toward a pixel electrode 191.

The data line 171 may be bent in a different direction at the connection portion between the first longitudinal part 171$a$ and the first transverse part 171$c$, the connection portion between the second longitudinal part 171$b$ and the first transverse part 171$c$, the connection portion between the first longitudinal part 171$a$ and the second transverse part 171$d$, and the connection portion between the second longitudinal part 171$b$ and the second transverse part 171$d$. That is, the data line 171 may be bent at least four times between two first longitudinal parts 171$a$ respectively disposed in two pixel rows PXR neighboring in the second direction DR2.

The first longitudinal part 171$a$ may overlap the pixel electrode 191 of the low gray pixel L but may not overlap the pixel electrode 191 of the high gray pixel H. Accordingly, as shown in FIG. 6, in the display device in which the high gray pixel H and the low gray pixel L are alternately disposed in the first direction DR1 and the second direction DR2, a plurality of the first longitudinal parts 171a included in each data line 171 may be alternately disposed in two pixel columns adjacent in the first direction DR1. That is, a plurality of the first longitudinal parts 171a included in each data line 171 may alternately overlap the pixel electrodes 191 in the low gray pixels L disposed in adjacent pixel columns. Accordingly, the data line 171 may have an approximate zigzag shape in which the data line 171 is bent periodically in every pixel row PXR.

The first longitudinal part 171a of the data line 171 may not overlap or may partially overlap the longitudinal part 133 of the storage electrode line 131. FIG. 6 shows an example in which the first longitudinal part 171a of the data line 171 does not overlap the longitudinal part 133 of the storage electrode line 131.

The shape of two data lines 171 neighboring in the first direction DR1 may be symmetrical to each other with respect to a line passing through centers of pixels in one column along the second direction DR2.

Among the regions where the pixel electrode 191 of the low gray pixel L is disposed, the region enclosed by a pair of data lines 171 disposed at the left and right edges of the pixel electrode 191, the transverse part 131b of the storage electrode line 131 disposed at the upper edge of the pixel electrode 191, and the transverse part 131a of the storage electrode line 131 disposed at the lower edge of the pixel electrode 191 or the light blocking member 220 may be a light transmission part where light of the image of the corresponding low gray pixel L is emitted.

Among the regions where the pixel electrode 191 of the high gray pixel H is disposed, the region enclosed by the longitudinal part 133 of a pair of storage electrode lines 131 disposed outside the left and right edges of the pixel electrode 191, the transverse part 131b of the storage electrode line 131 disposed at the upper edge of the pixel electrode 191, and the transverse part 131a of the storage electrode line 131 disposed at the lower edge of the pixel electrode 191 or the light blocking member 220 may be a light transmission part where light of the image of the corresponding high gray pixel H is emitted.

The size or the plane area of the pixel electrode 191 of each pixel PX H and L may be substantially the same, and in this case, the area of the light transmission part of the high gray pixel H may be larger than the area of the light transmission part of the low gray pixel L because both sides of the pixel electrode 191 in the low gray pixel L along the first direction DR1 is covered by the first longitudinal part 171a of the data lines.

In a conventional structure in which the data line 171 is disposed on the boundary between two pixel electrodes 191 adjacent in the first direction DR1 not to overlap the two pixel electrodes 191, when a misalignment of the data lines 171 occurs in the first direction DR1, a parasitic capacitance between the data line 171 and the pixel electrode 191 adjacent thereto increases due to an overlapping area of the data line 171 and the pixel electrode 191, thereby deteriorating the luminance of the pixel. Therefore, in the case of the one-pixel staggered structure or the two-pixel staggered structure described above, stains may be seen every one pixel row or every two pixel rows due to a difference in luminance. To prevent this problem, a method of ameliorating the parasitic capacitance between the data line 171 and the pixel electrode 191 by forming a shielding electrode to overlap the data line 171 disposed between two neighboring pixel electrodes 191 using the same layer as the pixel electrode 191 may be applied, and/or by increasing the width of the longitudinal part 133 of the storage electrode line 131 along the first direction DR may be used. Accordingly, the transmittance of the pixel may be deteriorated.

However, according to an embodiment of the present inventive concept, since the first longitudinal part 171a of the data line 171 adjacent to the light transmission part of the high gray pixel H and the low gray pixel L only overlaps the pixel electrode 191 of the low gray pixel L, the side visibility of the display device is improved, and the deviation of the parasitic capacitance between the data line 171 and the pixel electrode 191 and the deviation of the luminance of the pixel between adjacent high gray pixels H and between adjacent low gray pixels L due to the misalignment in the first direction DR1 of the data line 171 may be reduced. Therefore, it is possible to prevent the stains from recognized by a user even in the one-pixel stagger structure or the two-pixel stagger structure. In addition, since there is no need to additionally form the shielding electrode between the pixel electrode 191 and the data line 171 and/or there is no need to extend the width of the longitudinal part 133 of the storage electrode line 131 along the first direction DR1 as in the conventional art, the aperture ratio and transmittance of the pixel PX H and L may be further increased.

Referring to FIG. 9 and FIG. 10, the first angle AH formed between the first direction DR1 (or the transverse stem part 192) and the branch part 194 of the pixel electrode 191 in the high gray pixel H may be less than the second angle AL formed between the first direction DR1 (or the transverse stem part 192) and the branch part 194 of the pixel electrode 191 in the low gray pixel L. For example, the second angle AL in the low gray pixel L may be about 45 degrees so as to maximize the transmittance of the low gray pixel L, and the first angle AH of the high gray pixel H may be an angle of less than 45 degrees, for example an angle from about 35 degrees to about 42 degrees, so as to lower the luminance of the high gray pixel H.

The width We2 of the branch part 194 and the width Ws2 of the slit between the adjacent branch parts 194 of the pixel electrode 191 in the low gray pixel L may be set to be a condition that the luminance of the low gray pixel L is a maximum, and the width We1 of the branch part 194 and the width Ws1 of the slit between the adjacent branch part 194 of the pixel electrode 191 in the high gray pixel H may be set to be a condition that the luminance is lower than the maximum. For example, the width We1 of the branch part 194 of the pixel electrode 191 in the high gray pixel H may be smaller than the width We2 of the branch part 194 in the pixel electrode 191 of the low gray pixel L.

For example, the width of the slit Ws2 between the adjacent branch parts 194 of the pixel electrode 191 in the low gray pixel L may be about 2.4 micrometers, the width of the branch part 194 We2 of the pixel electrode 191 in the low gray pixel L may be about 3.5 micrometers to about 3.7 micrometers, and the width of the branch part 194 We1 of the pixel electrode 191 in the high gray pixel H may be about 2.5 micrometers to about 2.7 micrometers.

Both the angles AH and AL of the branch part 194 with the first direction DR1 or the transverse stem part 192 and/or the widths We1 and We2 of the branch part 194 may be changed. The angles AH and AL of the branch part 194 with the first direction DR1 or the transverse stem part 192 and/or the widths We1 and We2 of the branch part 194 may be changed depending on the width of the data line 171 along the first direction DR1. The numerical examples described above may be examples where the width of the data line 171 along the first direction DR1 is approximately 5 micrometers.

As above-described, the first angle AH of the branch part 194 of the high gray pixel H with the first direction DR1 or the transverse stem part 192 and/or the width We1 of the branch part 194 are set to be the condition that the luminance of the high gray pixel H is lower than the maximum luminance, thereby improving the visibility.

On the other hand, according to an embodiment of the present inventive concept, the data line 171 does not overlap the pixel electrode 191 in the high gray pixel H but overlaps only the pixel electrode 191 in the low gray pixel L, and then the aperture ratio of the low gray pixel L may be reduced by the area overlapping the data line 171 so that the luminance of the low gray pixel L may be lowered. Accordingly, a stain may occur due to the luminance difference between the high gray pixel H without overlapping the data line 171 and the low gray pixel L overlapping the data line 171, however, as above-described, as the first angle AH of the branch part 194 of the high gray pixel H with the first direction DR1 or the transverse stem part 192 and/or the width We1 of the branch part 194 are set so as to lower the luminance of the high gray pixel H below the maximum luminance to improve the visibility, the luminance difference between the high gray pixel H and the low gray pixel L is resultantly compensated, thereby improving the stain caused by the luminance difference between the high gray pixel H and the low gray pixel L.

Next, the display device according to an embodiment of the present inventive concept is described with reference to FIG. 11 as well as accompanying drawings.

Figure 11:
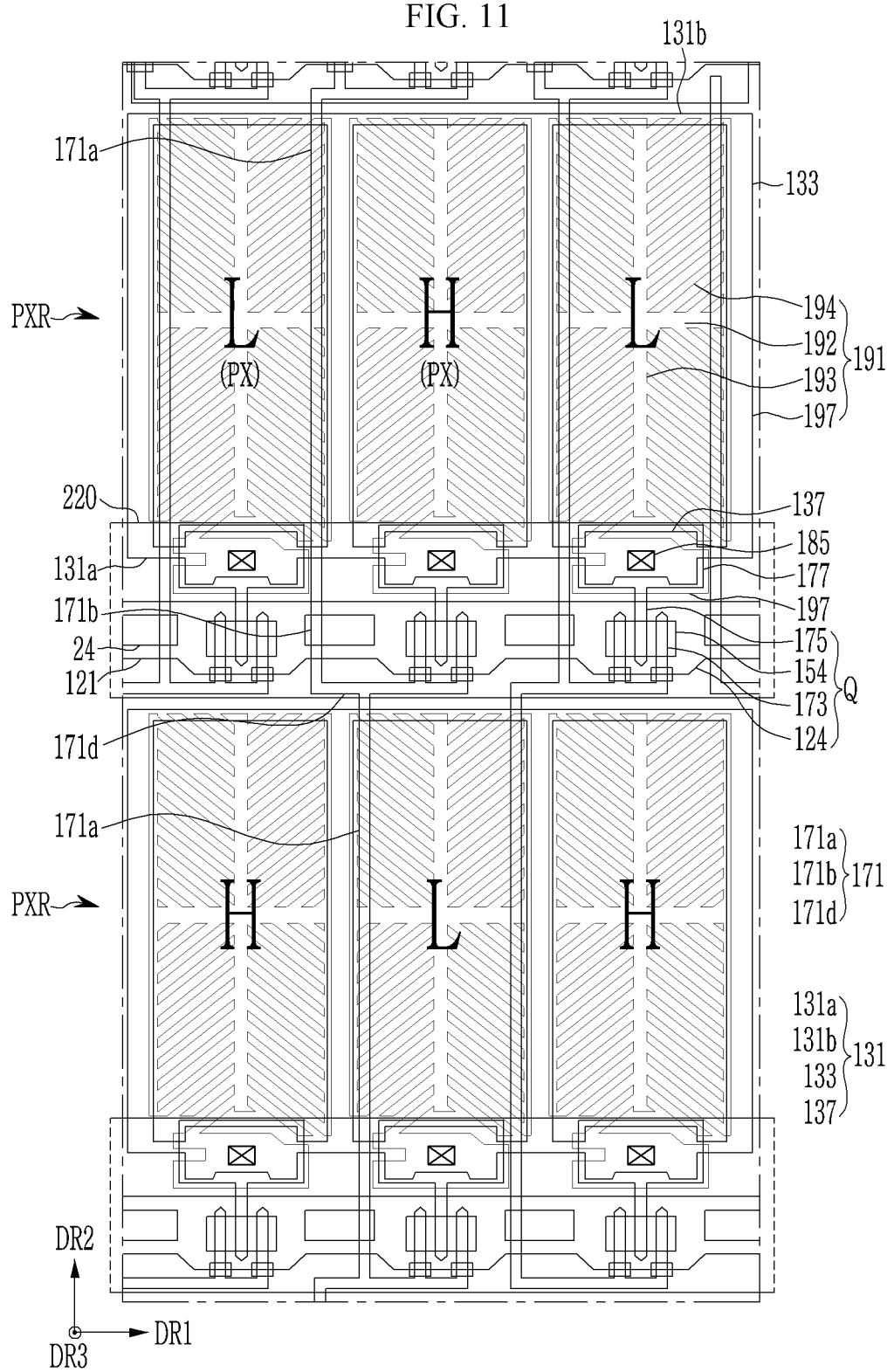
FIG. 11 is a layout view for a plurality of pixels of a display device according to an embodiment of the present inventive concept.

FIG. 11 is a layout view of a plurality of pixels of a display device according to an embodiment of the present inventive concept.

Referring to FIG. 11, the display device according to an embodiment of the present inventive concept is the same as most of the display device shown in FIG. 6 described above, however the structure of the data line 171 may be different. The data line 171 according to the present embodiment may not include the first transverse part 171c according to the above-described embodiment.

The second longitudinal part 171b may be aligned in the second direction DR2 with the first longitudinal part 171a disposed in the pixel row PXR disposed upward in a plan view. That is, the extending line of the second longitudinal part 171b may coincide with the extending line of the first longitudinal part 171a disposed in the pixel row PXR disposed upward in a plan view. In other words, the second longitudinal part 171b in FIG. 6 is omitted in the embodiment in FIG. 11. Instead, the first longitudinal part 171a further extends to downward to be connected to the second transverse part 171d.

Unlike the example shown in FIG. 11, the second longitudinal part 171b may be aligned with the first longitudinal part 171a disposed in the pixel row PXR disposed downward in a plan view in the second direction DR2. In other words, the second longitudinal part 171b in FIG. 6 is omitted and the first longitudinal part 171a disposed in the pixel row PXR downward further extends to upward to be connected to the first transverse part 171b.

The second transverse part 171d may connect the lower end of the second longitudinal part 171b (or the extended portion of first longitudinal part 171a) and the first longitudinal part 171a disposed in the pixel row PXR downward.

In the connection part between the extended first longitudinal part 171a and the second transverse part 171d and the connection part between the second longitudinal part 171b and the second transverse part 171d, the data line 171 may be bent. That is, the data line 171 may be bent at least twice between two first longitudinal parts 171a respectively disposed in two pixel rows PXR neighboring in the second direction DR2.

In addition, remaining features and effects of the display device according to the embodiment described above may be equally applied to the present embodiment.

Figure 12:
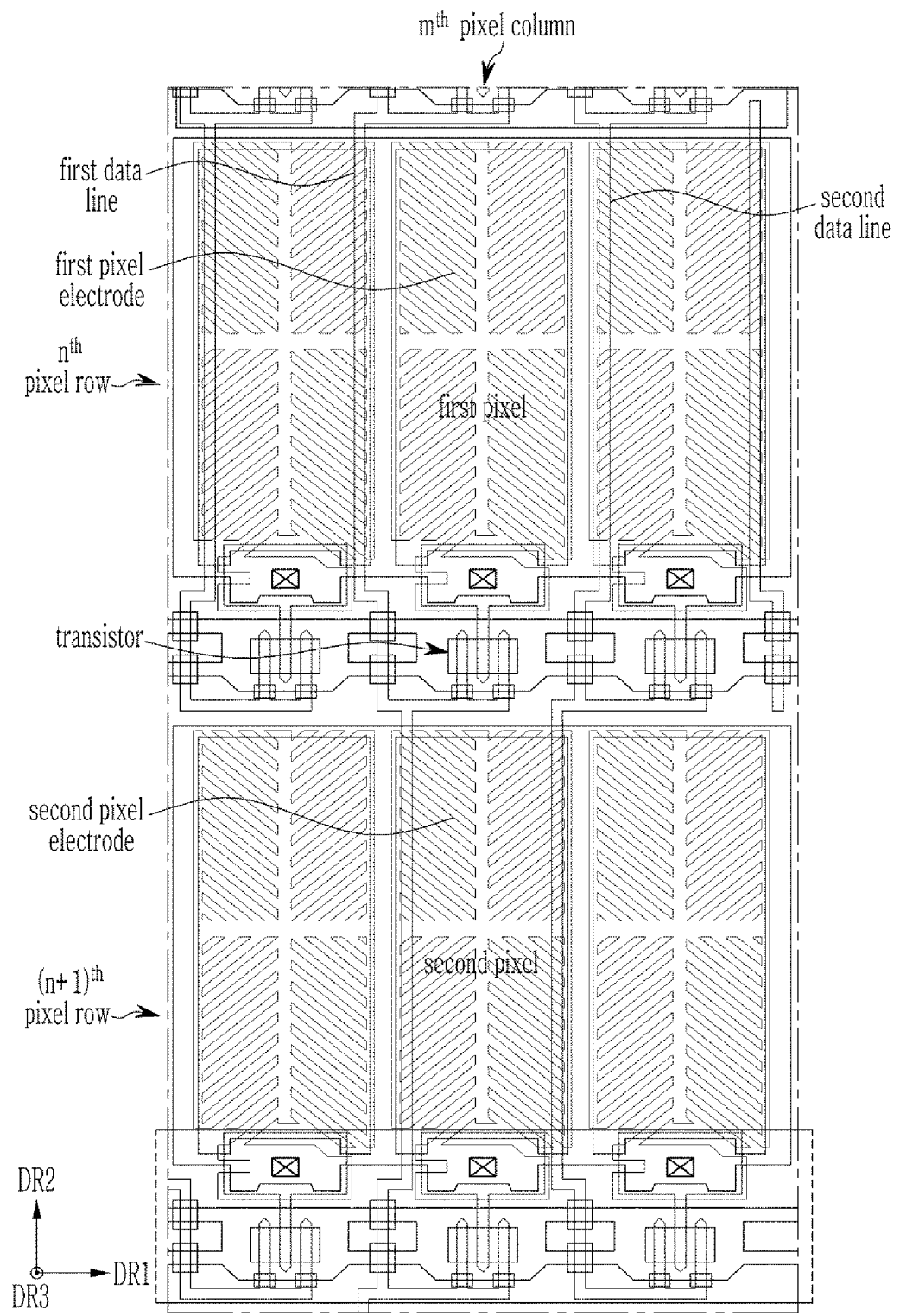
FIG. 12 is a layout view for a plurality of pixels of a display device according to an embodiment of the present inventive concept.

FIG. 12 is a layout view for a plurality of pixels of a display device according to an embodiment of the present inventive concept.

Referring to FIG. 12, the display device according to an embodiment of the present inventive concept is the same as most of the display device shown in FIG. 6 described above. The display device according to an embodiment of the present inventive concept comprises: a plurality of gate lines extending along a first direction DR1; a plurality of data lines extending along a second direction DR2 which intersect the first direction DR1; a plurality of pixels including a plurality of pixel electrodes disposed in a matrix configuration, each of the plurality of pixels including a transistor connected to one of the plurality of gate lines and one of the plurality of data lines, respectively, and a pixel electrode connected to the transistor, the plurality of pixels including a first pixel which includes a first pixel electrode connected to a first data line and is disposed in $n^{th}$ pixel row (n is a natural number) and $m^{th}$ pixel column (m is a natural number), and a second pixel which includes a second pixel electrode connected to the first data line or a second data line disposed adjacent to the first data line and is disposed in $(n+1)^{th}$ pixel row and the $m^{th}$ pixel column, wherein the first data line does not overlap the first pixel electrode and overlaps the second pixel electrode While this inventive concept has been described in connection with what is presently considered to be practical embodiments, it is to be understood that the inventive concept is not limited to the disclosed embodiments. On the contrary, it is intended to cover various modifications and equivalent arrangements included within the spirit and scope of the appended claims.

What is claimed is:

1. A display device comprising:
   a plurality of gate lines extending along a first direction;
   a plurality of data lines extending along a second direction which intersect the first direction; and
   a plurality of pixels including a plurality of pixel electrodes disposed in a matrix configuration, each of the plurality of pixels including a transistor connected to one of the plurality of gate lines and one of the plurality of data lines, respectively, and a pixel electrode connected to the transistor, the plurality of pixels including a first pixel which includes a first pixel electrode connected to a first data line and is disposed in $n^{th}$ pixel row, where n is a natural number, and $m^{th}$ pixel column, where m is a natural number, a second pixel which includes a second pixel electrode connected to the first data line or a second data line disposed adjacent to the first data line and is disposed in $(n+1)^{th}$ pixel row and the $m^{th}$ pixel column, and a third pixel which includes a third pixel electrode and is disposed in the $n^{th}$ pixel row and $(m-1)^{th}$ pixel column,
   wherein the first data line does not overlap the first pixel electrode and overlaps the second pixel electrode and the third pixel electrode, and wherein the first data line includes:
- a first longitudinal part overlapping the third pixel electrode and extending in the second direction;
- a second longitudinal part overlapping the second pixel electrode and extending in the second direction; and
- a third longitudinal part extending in the second direction and disposed between extension lines of the first longitudinal part and the second longitudinal part in the first direction not to overlap the extension lines of the first longitudinal part and the second longitudinal part, and crossing a first gate line and overlapping a light blocking member disposed between the second pixel electrode and the third pixel electrode, and the third longitudinal part crosses and overlaps an opening formed in the first gate line from one side of the opening to an opposite side of the opening, and
- a width along the first direction of the third longitudinal part is uniform for the entire portion of the third longitudinal part inside the opening formed in the first gate line.

2. The display device of claim 1, wherein the first data line further includes a first transverse part connecting the second longitudinal part and the third the longitudinal part and extending in the first direction.

3. The display device of claim 2, wherein the first data line further includes a second transverse part connecting the first longitudinal part and the third longitudinal part.

4. The display device of claim 1, wherein the second data line does not overlap the first pixel electrode and overlaps the second pixel electrode.

5. The display device of claim 4, wherein the first data line and the second data line are symmetrical to each other with respect to a line passing through centers of pixels in the mth column in the second direction.

6. The display device of claim 1, further comprising a data driver electrically connected to the plurality of data lines,
wherein the data driver generates a first data voltage corresponding to the first pixel electrode depending on a first gamma curve, and generates a second data voltage corresponding to the second pixel electrode depending on a second gamma curve that is different from the first gamma curve, and transmits the first data voltage and the second data voltage to the first data line.

7. The display device of claim 6, wherein the plurality of pixel electrodes include:
- a first gamma pixel electrode receiving a data voltage according to the first gamma curve;
- a second gamma pixel electrode receiving a data voltage according to the second gamma curve; and
- the first gamma pixel electrode and the second gamma pixel electrode are alternately arranged in the first direction and in the second direction.

8. The display device of claim 6, wherein each of the first pixel electrode and the second pixel electrode includes:
- a transverse stem part extending in the first direction;
- a longitudinal stem part extending in the second direction;
- a plurality of branch parts extending in a different direction from the first direction and the second direction; and
- a first angle formed by a branch part included in the first pixel electrode with the first direction is smaller than a second angle formed by a branch part included in the second pixel electrode with the first direction.

9. The display device of claim 6, wherein each of the first pixel electrode and the second pixel electrode includes:
- a transverse stem part extending in the first direction;
- a longitudinal stem part extending in the second direction; and
- a plurality of branch parts extending in a different direction from the first direction and the second direction; and
- a width of the branch part included in the first pixel electrode is smaller than a width of the branch part included in the second pixel electrode.

10. The display device of claim 1, wherein pixel electrodes disposed in the nth pixel row and the (n+1)th pixel row in the mth pixel column are electrically connected to the first data line, and
pixel electrodes disposed in the (n+2)th pixel row and the (n+3)th pixel row in the mth pixel column are electrically connected to the second data line.

\* \* \* \* \*